Patented May 11, 1943

2,318,919

UNITED STATES PATENT OFFICE 2,318,919

TREATMENT OF WASTE LIQUOR

Charles J. Brockman, Athens, Ga.

No Drawing. Application October 4, 1938,
Serial No. 233,295

2 Claims. (Cl. 210—2)

This invention relates to the treatment of waste liquors to render the same suitable for discharge into ordinary surface waters such as rivers, lakes and the like without creating a nuisance and more particularly it refers to such treatment of black liquor from paper mills for that purpose.

Although the invention contemplates in general the processing of waste liquors which are alkaline in nature and contain impurities similar to those found in black liquor, the process is peculiarly adapted to the clarification and partial purification of the effluent waste liquor from a paper mill employing the soda or sulfate processes. The invention will, therefore, be hereinafter discussed in its application to the treatment of black liquor, it being understood that the invention is applicable to handling of similar wastes regardless of source.

In the manufacture of paper by the soda and sulfate processes, cellulose fibers are freed from lignin and resinous binders by the action of caustic. Many methods of operation are known for the draining and washing of the disintegrated cellulose but for the present purpose it suffices to note that the effluent liquids contain relatively large amounts of organic materials in solution and in suspension as compounds containing sodium. This black liquor also contains substantial amounts of inorganic salts. Dumping of these wastes into streams causes great pollution thereof and if the stream be relatively small, the water will be rendered highly toxic to plant and animal life by the discharge of large quantities of black liquor from a sizeable paper plant.

This problem has long been a subject for research in the paper industry in an attempt to discover a method whereby the waste liquor may be rendered innocuous for discharge into a flowing stream or, alternatively, disposed of without such discharge. Important advances have been made in connection with the latter method and a number of plants now recover sodium for reuse in the process by treating liquor concentrate with lime. The concentrate may be obtained either by evaporation to dryness or by drying to about 50% solids, at which point the slurry will burn without added heat, and subsequent incineration of the concentrated liquor to obtain a black ash consisting principally of carbon and sodium carbonate. However, the cost of evaporation of the tremendous quantities of black liquor obtained from a plant of moderate size involves very great expense and in many cases is not justified by the recovery of caustic obtained because of the nature of the liquor as drawn from the digesters.

Additionally there are many circumstances in which incineration is not feasible because of the vile odors emitted from the plant and others in which the recovery of caustic by treatment with lime is attended with special difficulties which renders that process unsuitable from a commercial standpoint. There is, therefore, a real need in the industry for a process which will render the black liquor relatively harmless particularly for use in those plants where evaporation cannot be practiced without prohibitive expense or other great inconvenience.

It has now been found that black liquor may be treated in a relatively inexpensive manner to free it from harmful matter to produce an effluent of clear color, practically odorless and containing such small amounts of impurities that it may be dumped into a flowing stream without appreciably impairing the quality of the stream for all normal uses.

The invention contemplates the treatment of waste liquors with a small amount of sulfuric acid to make the mixture acid to litmus, diluting the mass, adding milk of lime to the resultant liquor and filtering to remove the precipitates. Such treatment avoids the difficulties heretofore encountered in attempts to remove dissolved and suspended solids from black liquor in that the undesirable material is separated substantially completely by a simple filtration or decantation, employing presently available commercial equipment. The invention further contemplates the inclusion in the complete process of additional steps such as electrolysis, preferably subsequent to the filtration step.

In the embodiment in which it has been found to be of the most important utility at the present time, the invention contemplates the provision of such a process for the treatment of black liquor from paper mills to produce an effluent which can be discharged into a lake, river or the like without objectionable effects. Other objects and advantages of this invention will be apparent from a consideration of the following disclosure thereof as applied to the treatment of black liquor.

In the treatment of a typical black liquor as drawn from the digesters at 65° C., there was added 0.7% by volume of concentrated sulphuric acid. In order to avoid a violent reaction upon addition of the acid, this reagent was diluted before the mixing step. The liquid mass was now found to give an acid reaction with litmus and considerable gas was evolved. A qualitative examination of the gases showed them to contain carbon dioxide, hydrogen sulfide and sulfur dioxide. It is probable that small amounts of other gaseous compounds are evolved from decomposition of corresponding salts in the solution.

The acidified hot liquid was then diluted with about three times its volume of water and a 4% milk of lime suspension was added until the mass gave an alkaline reaction with litmus. A voluminous precipitate, flocculent in nature, formed immediately and it was found that the precipitate settled rapidly to leave a clear to slightly reddish liquid which is sufficiently innocuous that it may be discharged into a moderate sized stream without substantial adverse effect on plant or animal life. The precipitate is readily separated from the liquid by decantation, but the liquid may be filtered for removal of the floc if desired.

After settling and separation of the precipitate by decantation or filtration, the relatively clear liquid may be subjected to electrolytic coagulation at temperatures in the neighborhood of 65° C. between iron electrodes at 10 volts with a current density of 0.57 ampere per square inch of effective electrode surface for two or three minutes.

Although good results may be obtained by varying the conditions of treatment set forth above, the data given here defines the preferred method of treatment. A theory has been formulated which appears to explain the results obtained and which is found to be very useful in determining variations in the process to adapt the same to black liquors and the like having different natures.

The literature on the subject indicates that the chemical composition of black liquor is very complex and typical analyses show very large amounts of ligneous and resinous bodies, probably as sodium salts; together with salts of organic acids, sulfides, sulfites and carbonates. The liquid, as drawn from the digesters is alkaline and repeated attempts to render it suitable for filtration by the addition of lime have met with very little success. It appears that the replacement of sodium in combination by calcium cannot be accomplished to any material extent in a practicable period of time.

According to the present process the solution is made acid to litmus, probably converting salts to free acids which are then capable of combination with lime to form flocculent precipitates. The amount of acid required with most black liquors is at least 0.6% $H_2SO_4$, but I prefer to use seven tenths of one per cent because of the better results to be obtained thereby. The tests I have made indicate that more than 0.7% $H_2SO_4$ is, in most instances, a waste of acid. The liquor now contains free acids, principally as solute, separated lignin, pentosans and wood gum which are not freely soluble in acid solutions.

The material under treatment may be filtered at this stage, but I prefer to add lime without prior filtration since the materials which could be removed by filtration appear to assist in the precipitation and clarification.

The milk of lime suspension used to cause precipitation is preferably of a concentration between 3 and 5 per cent by weight of lime and is added until the resultant mixture is alkaline to litmus. The precipitate formed contains a considerable amount of calcium sulfate and a large quantity of organic material, probably as calcium salts. The dilution of the acid solution before addition of lime noted above seems to be quite important to good results. The black liquor is rather colloidal in nature and there is a peptizing action which materially retards precipitation if the acid solution is not diluted. The addition of two volumes of water to one volume of acidified liquor gives improvement of precipitation but is inferior in that respect to the process employing three or four volumes of diluent water. In view of the added expense of handling large volumes of liquid, I find it preferable to dilute the acidfied black liquor to four times its original volume, e. g., three volumes of water to one volume of black liquor.

Electrolytic precipitation is unnecessary in most instances where an ample stream is available to receive the effluent, treated liquor. It may be found advisable to add this step to the process where the effluent is dumped into a stream of relatively small flow or into a small lake. This invention contemplates electrolytic treatment either before or after filtration or decantation, but I prefer that electrolysis shall follow rather than precede separation of the material precipitated by the lime treatment.

I claim:

1. A process for the treatment of black liquor from the sulfate process of paper pulp manufacture for the purpose of rendering said black liquor relatively innocuous and suitable for discharge into ordinary surface waters, comprising mixing approximately 0.7% by volume of concentrated sulfuric acid, based on the volume of the black liquor treated, with said black liquor while the latter is at a temperature of about 65° C., diluting the mixture with from two to four times its volume of water; adding milk of lime containing from 3 to 5% of calcium oxide until the mass is alkaline to litmus; and separating precipitated solid matter therefrom to obtain a treated black liquor suitable for discharge into said surface waters.

2. A process for the treatment of black liquor from the sulfate process of paper pulp manufacture for the purpose of rendering said black liquor relatively innocuous and suitable for discharge into natural waters comprising, acidifying the black liquor with sulfuric acid while said black liquor is at a temperature of about 65° C., diluting the mixture with from two to four times its volume of water, adding milk of lime containing from 3 to 5% of calcium oxide until the mass is alkaline to litmus, and separating precipitated solid matter therefrom to obtain a treated black liquor suitable for discharge into said natural waters.

CHARLES J. BROCKMAN.